United States Patent [19]

Ferrar

[11] 4,407,161
[45] Oct. 4, 1983

[54] FLUID JET DISPLACEMENT DETECTOR

[75] Inventor: Carl M. Ferrar, East Hartford, Conn.

[73] Assignee: United Technologies Corporation, Hartford, Conn.

[21] Appl. No.: 347,764

[22] Filed: Feb. 11, 1982

[51] Int. Cl.³ ............................................. G01P 15/08
[52] U.S. Cl. .................................. 73/505; 73/516 LM
[58] Field of Search .................. 73/505, 515, 516 LM, 73/861.39; 235/200 R, 200 PF; 137/334, 830, 831

[56] References Cited

U.S. PATENT DOCUMENTS

| | | | |
|---|---|---|---|
| 3,500,691 | 3/1970 | Moore | 73/516 LM |
| 3,587,328 | 6/1971 | Schuemann | 73/516 LM |
| 3,626,765 | 12/1971 | Moore et al. | 73/505 |
| 4,020,700 | 5/1977 | Lopiccolo et al. | 73/516 LM |

Primary Examiner—James J. Gill
Attorney, Agent, or Firm—David L. Adour

[57] ABSTRACT

A device for detecting displacements of a fluid jet is disclosed. The device is particularly suitable for use as part of a fluidic angular rate sensor. The device comprises a wire resistor suspended between a pair of metal posts, a means for producing a magnetic field at the location of the resistor, an alternating current (AC) source electrically connected across the resistor for heating the resistor and for interacting with the magnetic field to cause the resistor to oscillate, and readout electronics for sensing changes in wire resistance which are a function of wire temperature variations associated with fluid jet displacements. The use of a single oscillatory wire resistor eliminates the need for the difficult to achieve and costly wire matching procedures of conventional two wire fluid jet displacement detectors.

16 Claims, 4 Drawing Figures

FLUID JET DISPLACEMENT DETECTOR

BACKGROUND OF THE INVENTION

The present invention relates to fluidic angular rate sensors and more particularly to devices for detecting displacements of fluid jets.

In fluidic devices of various types, such as fluidic angular rate sensors, it is desirable to detect small displacements of fluid jets relative to a fixed axis and to convert the detected information to electrical signals. One technique for detecting such jet displacements is to heat a temperature sensitive wire resistor, centered on an axis defined by the undisplaced fluid jet, to a selected operating temperature and monitor wire resistance variations due to displacements of the fluid jet. However, this technique has several inherent disadvantages. For example, ambient temperature changes may be erroneously detected as jet displacement. Also, it is difficult to measure relatively small absolute wire temperature and resistance changes due to small displacements of the fluid jet. Moreover, it is impossible to determine the algebraic sign (direction) of the jet displacement solely by using this technique.

Sensitivity to ambient temperature changes and difficulties associated with measuring absolute wire temperature and resistance changes and with determining the displacement direction may be mitigated by using a two wire detector and measuring resistance differences between the two wires. According to this two wire technique a matched pair of hot wires is mounted in the fluid jet stream so that the wires are located symmetrically on either side of the axis defined by the center line of the undisplaced jet velocity profile and the differential resistance between the two wires is monitored. The nominally identical wires are equally cooled by an undisplaced jet so that their temperatures, and thus their resistances, are equal. Displacement of the fluid jet upsets the symmetry and unbalances the resistance.

Unfortunately, resistance unbalance in the two wire detector may also result from extraneous effects, such as ambient temperature changes, unless the wires are truly identical in characteristics such as geometry and composition. The precise wire matching needed to prevent false displacement indications due to such extraneous effects is difficult and costly to achieve. Also, it is difficult to maintain precise wire matching because of physical changes in the wires during the operating life of a sensor of which the wires are a part. These problems are of concern in manufacturing angular rate sensors which use the matched wire technique to detect displacements of a small gas jet subjected to forces such as rotation induced Coriolis forces.

According to the principles of the present invention an oscillating wire detector overcomes the difficulties of a two wire detector without incurring the disadvantages of a stationary one wire detector. The wire is oscillated through a fixed axis and in a plane generally perpendicular to the fluid jet stream. Change in average temperature or resistance variation of the oscillating wire as a function of wire position indicates the amount of displacement of the fluid jet relative to the fixed axis. Ambient temperature changes are effectively averaged out and relatively small temperature changes due to small jet displacements are detectable because only differences in temperature or resistance are measured.

SUMMARY OF THE INVENTION

Therefore, an object of the present invention is to detect displacements of a fluid jet relative to a fixed axis in a relatively simple, inexpensive, and efficient manner.

Another object of the present invention is to provide a fluid jet displacement detector which is relatively easy to manufacture and maintain and which is relatively insensitive to extraneous effects such as ambient temperature changes.

A further object of the present invention is to provide a fluidic angular rate sensor having a fluid jet displacement detector with the foregoing characteristics.

These and other objects of the present invention are attained by a device comprising a fluid flow velocity sensitive element, which is oscillated through a fixed axis and is oscillated in a plane generally perpendicular to a fluid jet stream whose displacement is to be detected. The device generates signals corresponding to changes in flow velocity variations at the flow velocity sensitive element as the element oscillates through the fluid jet stream. The flow velocity variations result from displacements of the fluid jet stream relative to the fixed axis about which the flow velocity sensitive element oscillates.

A preferred embodiment of such a device comprises a temperature sensitive wire resistor, an alternating current (AC) power source, a means for producing a magnetic field, and readout electronics. The wire resistor is located downstream in the fluid jet and is centered with its longitudinal axis intersecting a fixed axis defined by the center line of the undisplaced fluid jet velocity profile. The AC power source is connected across the wire resistor to heat the wire resistor to a selected operating temperature above the ambient temperature of the fluid jet. The magnetic field is generally parallel to the fixed axis and generally perpendicular to the longitudinal axis of the wire resistor. The magnetic field interacts with the current flowing through the resistor to cause oscillations of the wire resistor in a plane generally perpendicular to the fixed axis. The temperature of the wire resistor varies either symmetrically or asymmetrically as a function of wire position relative to the fixed axis depending on whether or not the fluid jet is displaced relative to the longitudinal axis of the wire resistor. The readout electronics monitors resistance changes of the wire which are proportional to average temperature changes of the wire as a function of wire position relative to the fixed axis, and which indicate the amount of displacement of the fluid jet.

BRIEF DESCRIPTION OF THE DRAWING

Other objects and advantages of the present invention will be apparent from the following detailed description in conjunction with the accompanying drawing in which.

DESCRIPTION OF THE PREFERRED EMBODIMENT

Figure 1:
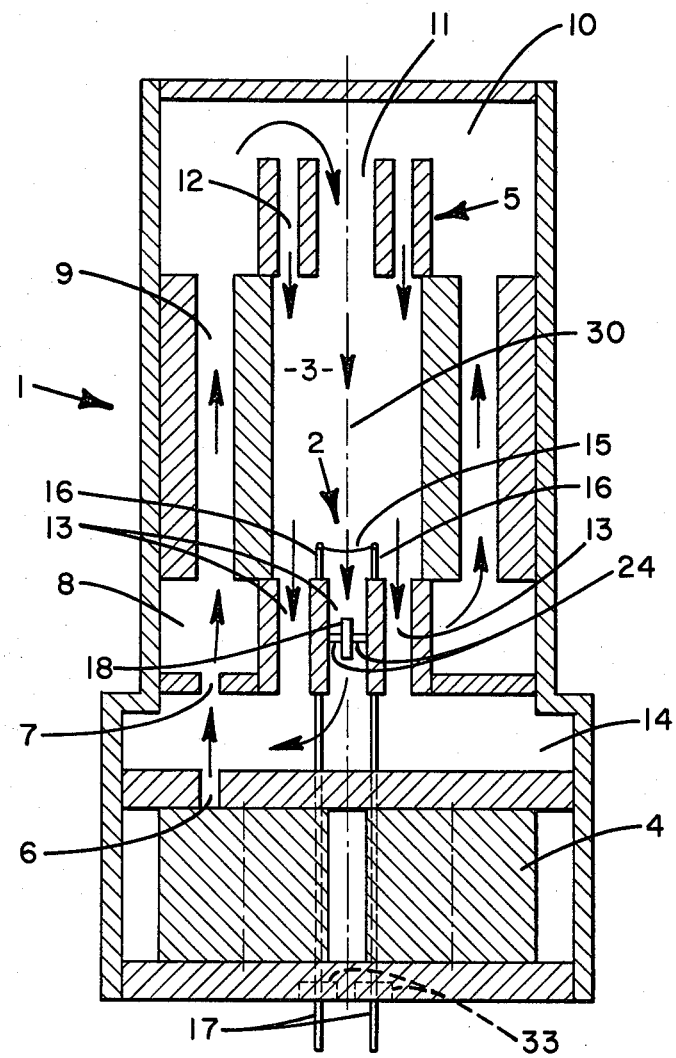
FIG. 1 is cross-sectional schematic illustration of a fluidic angular rate sensor having a fluid jet displacement detector according to the principles of the present invention.

Referring to FIG. 1, a cross-sectional schematic illustration of a hermetically sealed fluidic angular rate sensor 1 is shown. The fluid flow through the sensor 1 is illustrated by arrows. The rate sensor 1 includes a fluid flow circuit for creating a fluid jet having a flow path in a chamber 3 and a fluid jet displacement detector 2 for monitoring displacements of the jet according to the principles of the present invention.

The fluid flow circuit includes a pump assembly 4 for providing a fluid, such as an inert gas, to a nozzle block 5 to form a laminar flow fluid jet in chamber 3 which is directed toward detector 2. During normal operation of the rate sensor 1, fluid is pumped by the pump assembly 4 through a pump orifice 6 to a fluid feed port 7 and then into a fluid feed manifold chamber 8. The fluid is forced under pressure through fluid feed tubes 9 to inlet manifold 10 where the fluid enters the nozzle block 5. The fluid leaves the nozzle block 5 through a main nozzle 11 to form the fluid jet in the chamber 3 with a spatially symmetric velocity profile about a center line 30. After leaving the nozzle 11 the jet is directed toward and impinges on the detector 2 and flows through exhaust ports 13 to an exhaust chamber 14. Fluid from the exhaust chamber 14 enters the pump assembly 4 and the fluid flow cycle is repeated.

As illustrated in FIG. 1, in addition to the main nozzle 11 which forms the fluid jet, sleeve ports 12 in the nozzle block 5 provide streams of fluid around the jet to mitigate surface effects of the moving fluid within the jet. However, it should be noted that the sleeve ports 12 are not necessary if the magnitude of the surface effects is not sufficient to appreciably disrupt the jet.

Figure 2:
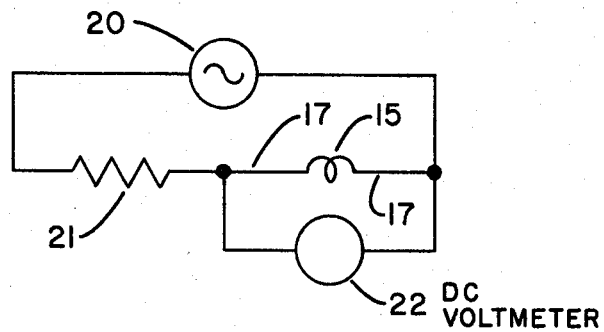
FIG. 2 shows a simple example of a wire drive and readout circuit for use with the fluid jet displacement detector shown in FIG. 1.
Figure 3:
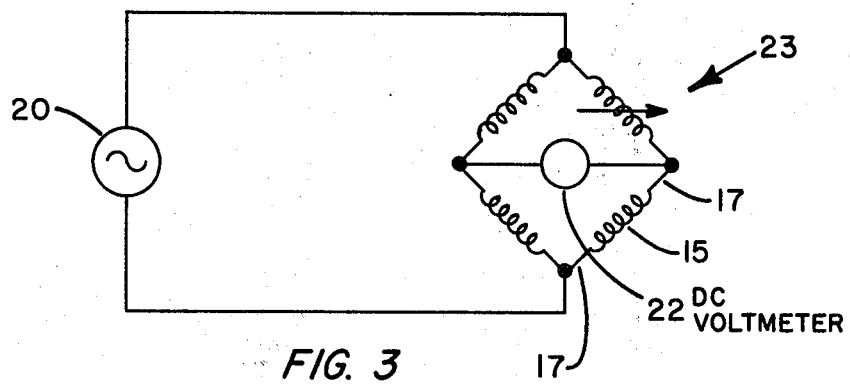
FIG. 3 shows a simple example of a bridge circuit for use with the fluid jet displacement detector shown in FIG. 1. This bridge circuit is an alternative to the wire drive and readout circuit shown in FIG. 2.

As shown in FIGS. 1, 2 and 3, the detector 2 comprises a temperature sensitive wire 15 centered on the undisplaced fluid jet axis 30, an alternating current (AC) source 20 (see FIG. 2 or 3) for providing an AC flow through the wire 15 to heat the wire 15 to a selected operating temperature and to interact with a magnetic field produced substantially parallel to axis 30 by magnet 18 to induce wire oscillations, and readout electronics (see FIG. 2 or 3) capable of detecting wire temperature variations associated with displacements of the fluid jet. The wire 15 is heated by the AC source 20 to an operating temperature above the ambient temperature of the fluid jet. The wire 15 is cooled by the fluid jet in proportion to the magnitude of the flow velocity of the portion of the jet in contact with the wire 15.

The wire 15 is suspended between a pair of metal pins 16 so that the wire 15 is positioned in the path of the fluid jet with the longitudinal axis of the wire 15 generally perpendicular to and intersecting the center line 30. The wire 15 is mounted on the pins 16, such as by a metallurgical bond, so that the wire 15 may undergo torsional oscillation back and forth about the axis generally perpendicular to the centerline 30. As illustrated in FIG. 1, the wire 15 swings in and out of the plane of the drawing.

The wire 15 is made of a material, such as tungsten, having a resistance which is dependent on temperature and, as shown in FIG. 1, the wire 15 is slightly bowed, rather than straight, to permit substantial oscillatory amplitude at moderate values of current and magnetic field. A downstream bow is preferred for maximum stability against fluid jet pressures and this configuration is shown in FIG. 1. However, it may be more convenient to form an upstream bow and this configuration may be used if desired.

The resistance of the wire 15 is measured by readout electronics which are connected to the wire 15 through electrical connectors 17 which are attached to the metal pins 16 to form an electrical circuit including the wire 15. The measured resistance of the wire 15 indicates wire temperature which is dependent on the position of the fluid jet relative to the longitudinal axis of the wire 15. The readout electronics may be located internally or externally of the sealed casing for the rate sensor 1. As shown in the Figures, the electrical connectors 17 extend through sealed feedthroughs 33 in the sensor casing, as shown in FIG. 1, and are connected to externally located readout electronics as shown in FIGS. 2 or 3.

As shown in FIG. 1, the magnet 18 is positioned near the wire 15 to provide a magnetic field at the wire 15 substantially parallel to the center line 30 and perpendicular to the longitudinal axis of the wire 15. If desired, special shaping of the magnet 18 and its supporting members 24 may be employed to minimize fluid flow disturbances. Alternatively, an electromagnet located external to the casing of the rate sensor 1, or any other such suitable means, may be used to produce the desired magnetic field at the wire 15.

The AC source 20 is controlled to heat the wire 15 to a selected operating temperature and to provide an AC drive to the wire 15 which interacts with the magnetic field of the magnet 18 to cause the wire 15 to oscillate. As shown in FIG. 1, the wire 15 oscillates generally perpendicular to the center line 30, in and out of the plane of the drawing. Any type of AC wave form such as a sine or square wave may be used as the AC drive for the wire 15. However, maximum power level requirement for the AC source 20 may be reduced by using an AC frequency which drives the wire 15 at a natural resonant frequency of wire oscillation.

The wire oscillations are substantially symmetric about the center line 30 when the AC drive is applied if the wire 15 is initially positioned directly on the center line 30. The wire 15 may be initially positioned by manual adjustment. Alternatively, an adjustable DC bias source in addition to the AC source 20, may be connected across the wire 15 to establish a current flow which interacts with the magnetic field of the magnet 18 to produce a force on the wire 15 moving the wire 15 to the desired initial position. If such an adjustable DC bias source is used then it may be necessary to compensate or account for the effect of the DC bias source on the readout electronics. Specifically, for the readout electronics shown in FIG. 2, it is necessary to compensate or account for the effect of a DC bias source on the reading of DC voltmeter 22. However, for the readout electronics shown in FIG 3, compensation is achieved automatically with respect to the effect of a DC bias source.

FIGS. 2 and 3 show examples of readout electronics for measuring the resistance of the wire 15. As shown in FIG. 2, an AC voltage source 20 is connected in series with the wire 15 and a current limiting resistor 21. A DC volt meter 22 is connected across the wire 15 to measure voltage across the wire 15. The resistor 21 allows the voltage across the wire 15 to change in response to changes in resistance of the wire 15. As shown in FIG. 3, the wire 15 is part of a bridge circuit 23. Changes in temperature, of the wire 15, which are unequal for opposite polarities of the AC source wave form result in wire resistance changes which unbalance the bridge circuit 23 to produce a net reading at DC voltmeter 22.

Figure 4:
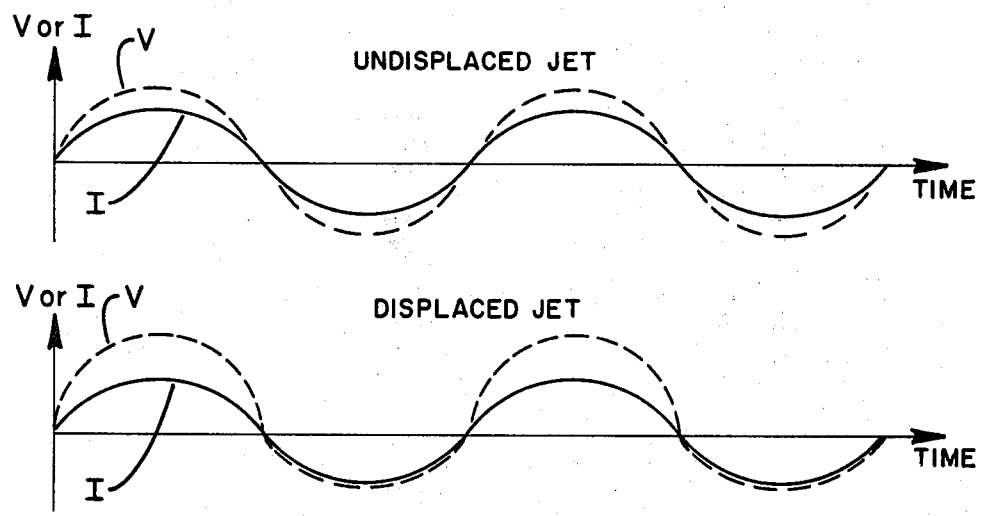
FIG. 4 is a graph illustrating the magnitude of the wire voltage, V, and wire current, I, as a function of time for the fluid jet displacement detector shown in FIG. 1. The top set of curves corresponds to an idealized voltage, V, and current, I, readout as a function of time for an undisplaced fluid jet and the bottom set of curves corresponds to an idealized voltage, V, and current, I, readout as a function of time for a displaced fluid jet.

FIG. 4 illustrates the basic readout concept of the present invention. When the fluid jet in chamber 3 is undisplaced, the oscillating wire 15 is cooled most when the wire 15 is midway between its extreme positions and thus is at the center of the fluid jet where there is highest fluid flow velocity. The flow velocity falls off symmetrically on either side of the center line 30, so the wire temperature and thus its resistance increases symmetrically at opposite extremes of the wire vibration as illustrated by the top set of curves shown in FIG. 4. Since the resistance change and the drive current wave form are symmetric with respect to drive current polarity, the voltage, V, across the wire 15 is similarly symmetric and exhibits no direct current (DC) component. However, if the fluid jet is displaced from the center line 30 of wire 30 of wire oscillation, the wire cooling is unequal at opposite extremes of the vibration as illustrated by the bottom set of curves shown in FIG. 4. The resistance is then higher for one polarity of drive current than for the other. Consequently, in a current limited circuit such as shown in FIG. 2, the voltage, V, across the wire 15 is larger for one polarity than for the other and contains a DC component in proportion to the cooling asymmetry and thus in proportion to the jet displacement relative to the longitudinal axis of the wire 15. Therefore, the magnitude of the DC component is a direct indication of the amount of deflection of the fluid jet relative to a single fixed axis.

It should be noted that the desired DC signal is accompanied by a large AC signal at the wire drive frequency. The readout system must reject this AC component while retaining adequate frequency response to accommodate all anticipated variations of the jet displacement. This is accomplished by setting the wire drive frequency well above the spectrum of anticipated jet motions and passing the readout signal through a low pass filter to reject the drive frequency. The burden on the low pass filter can be reduced, if desired, by incorporating the sensor wire 15 in a bridge circuit such as shown in FIG. 3.

Also, it should be noted that, if desired, a constant voltage source may be connected to the wire 15 and measurements made of variations in current flow through the wire 15 which are due to jet displacements. The oscillations of the wire 15 will not be affected significantly in typical situations wherein the variations in current flow through the wire 15 are relatively small compared to the magnitude of the AC drive signal.

In experimenting with various constructions for the detector 2, good results have been achieved with a 0.13 inch long chemically thinned commercial tungsten wire 15 having about a 150 microinch (3.8 micron) diameter with an arc height of about 0.08 inch. The distance from the wire 15 to a 0.09 inch diameter jet nozzle 11 was about 0.6 inch. Typical oscillatory amplitudes for the wire 15 in a magnetic field of about 150 gauss are on the order of several hundred microinches per millampere of AC drive current.

Alternative readout methods are possible. For example, the wire voltage, V, may be applied to a full-wave rectifier which responds identically to opposite polarities and provides a readily measured output indicating this response. If the voltage, V, wave form of the wire 15 is symmetric with respect to polarity, as is true when the fluid jet is not displaced, the rectifier output wave form will contain large DC and second harmonic components but none at the fundamental drive frequency. Fluid jet displacement results in unequal responses on alternate half cycles of the input so the output wave form will contain a fundamental component in proportion to the jet displacement. The fundamental component can be measured by using conventional lock-in amplifier techniques to determine the magnitude and polarity of the jet displacement.

Also, it should be noted that the present invention is not limited to sensing fluid flow velocity by monitoring resistance changes of a temperature sensitive wire 15. For example, an oscillating pressure sensitive element, such as an open ended tube with its open end facing the fluid jet and with a pressure transducer attached to the opposite end of the tube, may be used to generate electrical signals corresponding to the fluid flow velocity of the fluid jet. These electrical signals may be processed by readout electronics in the same manner as the electrical signals are processed for the wire 15. The tube may be oscillated by mechanical or magnetic mechanisms, piezoelectric bimorphs, or other means known in the art. Other such fluid flow velocity measuring elements will be apparent to one of ordinary skill in the art.

In addition to the alternatives discussed above, various other modifications and embodiments of the present invention are possible. For example, the oscillatinng wire 15 may be positioned off the center line 30 with its longitudinal axis in a plane generally perpendicular to the flow path of the fluid jet. Wire resistance changes due to jet displacements relative to the longitudinal axis of the wire 15 may be detected by using electronic processing to filter out resistance variations not due to jet displacements. Also, although shown and described in an angular rate sensor, a fluid jet displacement detector according to the present invention may be used in other applications such as in laboratory equipment for studying fluidic effects. Therefore, while the present invention has been described in conjunction with a particular embodiment it is to be understood that various modifications and other embodiments of the present invention may be made without departing from the scope of the invention as described herein and as claimed in the appended claims.

What is claimed is:

1. An angular rate sensor comprising:
   a housing;
   means for forming a fluid jet having a flow path within the housing and having a substantially spatially symmetric fluid velocity profile;
   a temperature sensitive element positioned in the housing in the path of the jet;
   means for heating the temperature sensitive element to an operating temperature;
   means for oscillating the temperature sensitive element through the path of the fluid jet in a plane generally perpendicular to the path of the jet; and
   means for generating signals corresponding to temperature variations of the temperature sensitive element as the element traverses the flow path of the fluid jet.

2. An angular rate sensor as recited in claim 1 wherein the temperature sensitive element comprises:
a wire resistor having its longitudinal axis generally perpendicular to the flow path of the fluid jet.

3. An angular rate sensor as recited in claim 2 wherein the means for heating the temperature sensitive element comprises:
an electrical power supply connected across the wire resistor to provide an alternating current flow through the resistor.

4. An angular rate sensor as recited in claim 3 wherein the means for oscillating the temperature sensitive element comprises:
means for producing a fixed magnetic field at the wire resistor generally parallel to the flow path of the jet and generally perpendicular to the longitudinal axis of the wire resistor.

5. An angular rate sensor as recited in claim 4 wherein the means for producing a magnetic field comprises a permanent magnet.

6. An angular rate sensor as recited in claims 4 or 5 further comprising:
an adjustable direct current power supply connected across the wire resistor, in addition to the alternating current power supply, to provide a direct current flow through the wire resistor which interacts with the fixed magnetic field to position the resistor in the path of the fluid jet.

7. An angular rate sensor of the type which monitors change in flow path of a fluid jet produced by external forces acting on the jet, said sensor comprising:
a sealed housing;
means for forming a fluid jet within the housing which is movable through a range of flow paths in response to external forces acting on the jet and which has a spatially symmetric velocity profile;
a temperature sensitive electrical wire;
means for suspending the temperature sensitive electrical wire across the center line of the flow path of the fluid jet when the jet is in an undisplaced position, said wire being capable of oscillating movement in a plane generally perpendicular to the center line of the undisplaced jet;
means for producing a magnetic field generally parallel to the flow path of the jet and generally perpendicular to the longitudinal axis of the temperature sensitive wire;
means for providing alternating electrical current to the wire to heat the wire to an operating temperature and to interact with the magnetic field to produce oscillatory movement of the wire; and
means for detecting changes in symmetry of the temperature variations of the wire as the wire oscillates through the fluid jet, to determine the amount of movement of the fluid jet relative to the longitudinal axis of the wire.

8. An angular rate sensor as recited in claim 7 wherein the means for forming a fluid jet within the housing comprises:
a nozzle which is capable of producing a fluid jet; and
a fluid pump assembly for pumping fluid through the nozzle to form the fluid jet.

9. An angular rate sensor as recited in claim 7 wherein the means for detecting changes in symmetry of the temperature variation of the wire comprises a volt meter for sensing direct current voltage drop across the wire in a current limited circuit.

10. A device for detecting displacements of a fluid jet having a substantially spatially symmetric fluid velocity flow profile, comprising:
a fluid flow velocity sensitive element positioned in the fluid jet;
means for oscillating the element through a fixed axis and in a plane generally perpendicular to the fluid jet; and
means for detecting variations in flow velocity sensed by the oscillating element which are due to displacements of the fluid jet relative to the fixed axis through which the element oscillates.

11. A device for detecting displacements of a fluid jet as recited in claim 10, wherein the flow velocity sensitive element comprises:
an electrically heated, temperature sensitive wire resistor having its longitudinal axis generally perpendicular to the fluid jet.

12. A device for detecting displacements of a fluid jet as recited in claim 11 wherein the means for oscillating the temperature sensitive element comprises:
an electrical power supply connected across the wire resistor to provide an alternating current flow through the resistor; and
means for producing a fixed magnetic field at the wire resistor generally parallel to the fluid jet and generally perpendicular to the longitudinal axis of the wire resistor.

13. A device for detecting displacements of a fluid jet as recited in claim 12 wherein said means for detecting flow velocity variations comprises:
a voltmeter electrically connected across the wire resistor for measuring voltage changes across the resistor while a known current flows through the resistor.

14. A device for detecting displacements of a fluid jet as recited in claim 12 wherein said means for detecting flow velocity variations comprises:
a bridge circuit connected to the wire resistor for measuring temperature dependent changes in the resistance of the resistor.

15. A method of measuring changes in the flow path of a fluid jet relative to a fixed axis, which comprises:
heating a wire resistor located in the flow path of the fluid jet to an operating temperature;
oscillating the wire resistor through the fixed axis and in a plane generally perpendicular to the flow path of the fluid jet; and
monitoring changes in temperature variations of the wire resistor as the wire resistor oscillates through the fluid jet to determine the amount of displacement of the fluid jet relative to the fixed axis.

16. A method of measuring changes in the flow path of a fluid jet relative to a fixed axis as recited in claim 15 wherein the steps of heating and oscillating the wire resistor comprise:
applying a fixed magnetic field at the location of the wire resistor, said field being generally parallel to the fluid jet flow path and generally perpendicular to the longitudinal axis of the wire resistor; and
passing an alternating current through the wire to heat the wire to the operating temperature and to interact with the magnetic field to produce oscillatory wire movements.

* * * * *